Aug. 25, 1964   L. H. GARDNER   3,145,967
ELASTIC SLEEVE VALVE
Filed April 27, 1962
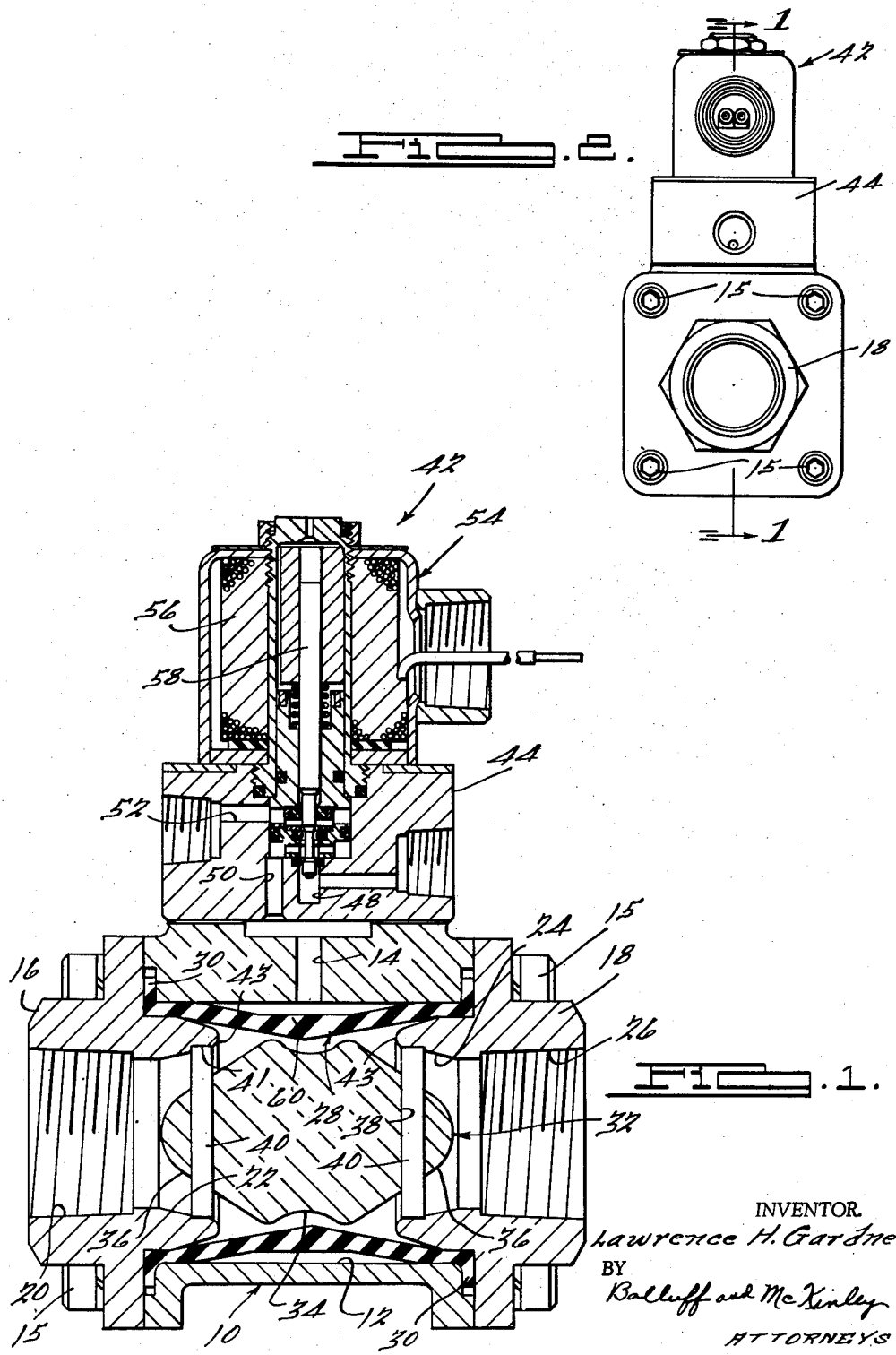
INVENTOR.
Lawrence H. Gardner
BY
Balluff and McKinley
ATTORNEYS

3,145,967
ELASTIC SLEEVE VALVE
Lawrence H. Gardner, 7313 Associate Ave.,
North Olmsted 9, Ohio
Filed Apr. 27, 1962, Ser. No. 190,574
1 Claim. (Cl. 251—5)

This invention relates to a flow control valve and more particularly to a valve in which a tubular sleeve of elastic rubber-like material is adapted to be constricted into sealing engagement with a co-axially disposed core so as to close the annular flow path normally provided between the sleeve and the core. A valve of this type is particularly suited for handling fluids containing abrasive material.

A principal object of the invention is to provide a new and improved flow control valve. A further object of the invention is to provide a flow control valve which includes a generally cylindrical core surrounded by tubular rubber sleeve so as to define an annular flow path between the core and the sleeve and in which the sleeve is constricted into sealing engagement with the core, to close the valve.

Other and further objects of the invention will be apparent from the following description and claim and may be understood by reference to the accompanying drawing which, by the way of illustration, shows a preferred embodiment of the invention and what I now consider to be the best method of applying the principles thereof. Other embodiments of the invention may be used without departing from the scope of the present invention as set forth in the appended claim.

In the drawing:

FIG. 1 is a sectional view of a valve embodying the invention and taken along the line 1—1 of FIG. 2; and FIG. 2 is an end elevation view of the valve on a reduced scale.

The valve comprises a valve body having a cylindrical bore 12 therethrough and a radial passage 14 intersecting the bore 12. End plugs 16 and 18, which may be identical in construction, are secured to the opposite ends of the valve body 10 in any suitable manner, such as by bolts 15. The end plug 16 has an axially disposed threaded opening 20 communicating with an outwardly tapered passage 22 constituting the valve inlet, while the end plug 18 has a similarly tapered passage 24 and a threaded opening 26 constituting the outlet. However, either opening 20 or 26 may function as the inlet and the other as the outlet.

A tubular elastic rubber sleeve or tube 28 is provided at its opposite ends with annular flanges 30 which are clamped between the valve body 10 and the end plugs 16 and 18. A core 32 is disposed within the sleeve 28 between the end plugs 16 and 18 and has an annular centrally disposed concave surface 34 which forms an annular valve seat. The core 32 is tapered inwardly from the valve seat 34 toward each end thereof to define streamlined conical portions 36 facing the inlet and outlet ports of the valve.

The conical portions 36 of the core are provided with diametrically extending bores 38, each of which receives a locating pin 10 which may be press fitted or otherwise secured thereto. The ends of the pins 40 are seated on the inner periphery of annular seats 41 formed in the plugs 16 and 18 and serve to locate the core 32 coaxially within the sleeve 28. The valve is a normally open valve in which the sleeve 28 is spaced from core 32 so as to define an anular fluid flow path through a valve between the core 32 and the sleeve 28. In its closed position the sleeve 28 is constricted into sealing engagement with the valve seat portion 34 of the core 32 so as to close the annular communication between the end plugs 16 and 18. The inner ends 43 of the plugs 16 and 18 are annular and rounded over so that there are no sharp edges which would otherwise serve to abrade the sleeve 28. The narrow gap between the ends 43 and the outer periphery of the core 32 form a part of the annular passage through the valve, but when the valve is closed due to seating of the sleeve 28 on the core 32, the sleeve material due to its elasticity tends to distend into the low-pressure side of the valve and this action is limited by the width of the gap between the annular ends 43 and the core 32, as well as by the pins 40 which extend across such gap. It will be observed that the pins 40 accurately and positively locate the core 32 within the valve sleeve 28.

A pilot valve indicated generally at 42 is provided for operating the valve and includes a valve body 44 secured to the valve body 10. The pilot valve 42 may be of any desired construction and in the form shown includes an inlet passage 48, a work port 50 and an exhaust port 52. A solenoid indicated at 54 includes a coil 56 which is adapted to shift a valve stem 58 from the deenergized position shown, in which the outlet port 52 is in open communication with the work port 50 to an energized position of the solenoid in which the work port 50 and the inlet port 48 are in communication. When the latter condition exists, air under pressure is supplied through the inlet port 48 and the work port 50 and the passage 14 to the annular space between the tube 28 and the valve bore 12 for constricting the sleeve 28 against the core 32, thereby to close the valve. The solenoid 54 is shown in its de-energized condition as the result of which no pressure is applied to the exterior of the sleeve 28 and the valve is open.

The flow control valve provided by this invention is extremely simple in construction and highly efficient in operation, but since the valve seat on the core 32 is located centrally of the valve 28, a minimum amount of flexure of the sleeve is required to effect an efficient seal when the valve is closed. Since the constriction of the sleeve 28 to close the valve involves some stretching of the rubber which forms that part of the valve between the end plugs, I have found it desirable to provide the sleeve 28 with a relatively thick section 60 at the center.

This application is a continuation-in-part of my prior copending application Serial No. 119,940, filed June 27, 1961, for "Valve," and now abandoned.

While I have illustrated and described a preferred embodiment of my invention, it is understood that this is capable of modification, and I therefore do not wish to be limited to the precise details set forth but desire to avail myself of such changes and alterations as fall within the scope of the following claim.

I claim:

A flow control valve comprising a pair of axially aligned, spaced, oppositely oriented, like end plugs, a valve body having a bore therethrough and secured in fixed surrounding relation to one end of each of said plugs, an annular imperforate rubber sleeve surrounding said ends of said plugs and the space therebetween and disposed within said body so that the intermediate portion of said sleeve disposed between said plugs is radially expansible and contractible, each of said end plugs having an axial bore therethrough communicating with the interior of said rubber sleeve, a core aligned with and disposed between said plugs and having an annular valve seat thereon of smaller diameter than the normal inner diameter of said sleeve, said core having a transversely disposed bore at each end thereof, a pin secured in each of said transverse bores, the ends of said pins being supported on the inside inner ends of said plugs to locate said core and valve seat coaxially with and centrally of said sleeve and so as to define an annular, normally open, unobstructed flow path between said sleeve and said core, the intermediate portion of said sleeve being of reduced diameter relative to the end portions thereof and normally out of contact with said valve seat, said valve seat cooperating with the intermediate reduced diameter portion of said rubber sleeve in its contracted condition so as to limit the inward and axial flexure thereof under the fluid pressure to which said sleeve is subjected, said intermediate portion of said sleeve being radially contractible into contact with said valve seat in response to a predetermined pressure differential on the interior and exterior of said sleeve so as to close said valve and prevent fluid flow from the inlet to the outlet, the space between said sleeve and tubular body forming an expansible pressure chamber to which fluid under pressure is supplied for controlling the expansion and contraction of said sleeve, said valve seat comprising an annular concave surface on the exterior of said core and said sleeve including a relatively thick annular section at the central portion thereof, the outer surface of said core being of such shape that the material of said sleeve in any given plane normal to said flow path is uniformly contracted in its closed position.

References Cited in the file of this patent

UNITED STATES PATENTS

| | | |
|---|---|---|
| 1,873,138 | Mitchell | Aug. 23, 1932 |
| 2,470,744 | Korn | May 17, 1949 |
| 2,622,620 | Annin | Dec. 23, 1952 |

FOREIGN PATENTS

| | | |
|---|---|---|
| 136,783 | Sweden | July 29, 1952 |
| 986,047 | France | Mar. 1, 1949 |